US012712228B2

(12) United States Patent
Lee et al.

(10) Patent No.: US 12,712,228 B2
(45) Date of Patent: Aug. 18, 2026

(54) BATTERY PACK WITH INCREASED LIFESPAN OF BATTERY CELL AND DEVICE INCLUDING THE SAME

(71) Applicant: LG ENERGY SOLUTION, LTD., Seoul (KR)

(72) Inventors: Jung Hoon Lee, Daejeon (KR); Jae Hun Yang, Daejeon (KR); Sang Yoon Jeong, Daejeon (KR); Jong Soo Ha, Daejeon (KR); Se Ho Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 711 days.

(21) Appl. No.: 17/913,991

(22) PCT Filed: Aug. 23, 2021

(86) PCT No.: PCT/KR2021/011182

§ 371 (c)(1),
(2) Date: Sep. 23, 2022

(87) PCT Pub. No.: WO2022/065699

PCT Pub. Date: Mar. 31, 2022

(65) Prior Publication Data

US 2023/0115425 A1 Apr. 13, 2023

(30) Foreign Application Priority Data

Sep. 22, 2020 (KR) ........................ 10-2020-0121933

(51) Int. Cl.
*H01M 10/00* (2006.01)
*H01M 10/04* (2006.01)
(Continued)

(52) U.S. Cl.
CPC ....... *H01M 50/24* (2021.01); *H01M 10/0481* (2013.01); *H01M 10/6551* (2015.04);
(Continued)

(58) Field of Classification Search
CPC ............. H01M 50/24; H01M 10/0481; H01M 10/6551; H01M 50/204; H01M 50/271; H01M 50/507; H01M 2220/20
See application file for complete search history.

(56) References Cited

U.S. PATENT DOCUMENTS 5,346,786 A * 9/1994 Hodgetts ........... H01M 10/0431 429/99
5,756,227 A * 5/1998 Suzuki ................ H01M 10/625 429/62
(Continued)

FOREIGN PATENT DOCUMENTS

CN 104995781 A 10/2015
CN 105705408 A 6/2016
(Continued)

OTHER PUBLICATIONS

Machine Translation of JP 2007-2944407, obtained Apr. 2025 (Year: 2007).*
(Continued)

*Primary Examiner* — Nicholas P D'Aniello
(74) *Attorney, Agent, or Firm* — Birch, Stewart, Kolasch & Birch, LLP

(57) ABSTRACT

A battery pack includes a plurality of battery modules stacked in a vertical direction in a horizontal state; a pressing member including an upper pressing plate located outside the battery modules, a lower pressing plate located under the battery modules, a plurality of side plates configured to connect the upper pressing plate and the lower pressing plate to each other and a reinforcement portion; and a pack case
(Continued)

configured to wrap the pressing member, wherein each of the side plates includes an upper side plate and a lower side plate disposed in tight contact with each other or fixed to each other via an adhesive, and the reinforcement portion is located at the portion at which the upper side plate and the lower side plate are disposed in tight contact with each other or fixed to each other, and a device including the same.

13 Claims, 10 Drawing Sheets

(51) Int. Cl.

| | |
|---|---|
| ***H01M 10/6551*** | (2014.01) |
| ***H01M 50/204*** | (2021.01) |
| ***H01M 50/24*** | (2021.01) |
| ***H01M 50/271*** | (2021.01) |
| ***H01M 50/507*** | (2021.01) |

(52) U.S. Cl.

CPC ....... *H01M 50/204* (2021.01); *H01M 50/271* (2021.01); *H01M 50/507* (2021.01); *H01M 2220/20* (2013.01)

(56) References Cited

U.S. PATENT DOCUMENTS

| | | | | |
|---|---|---|---|---|
| 2004/0021442 | A1 | 2/2004 | Higashino | |
| 2005/0089751 | A1 | 4/2005 | Oogami et al. | |
| 2005/0170241 | A1 | 8/2005 | German et al. | |
| 2013/0157089 | A1 | 6/2013 | Miyatake et al. | |
| 2015/0064514 | A1 | 3/2015 | Wu et al. | |
| 2015/0333356 | A1 | 11/2015 | Horlock et al. | |
| 2016/0036028 | A1 | 2/2016 | Tsuruta et al. | |
| 2016/0226036 | A1 | 8/2016 | Kim et al. | |
| 2016/0280306 | A1 | 9/2016 | Miyashiro et al. | |
| 2018/0151855 | A1 | 5/2018 | Iwasaki et al. | |
| 2018/0151908 | A1 | 5/2018 | An et al. | |
| 2018/0287111 | A1 | 10/2018 | Fukuoka et al. | |
| 2019/0363392 | A1 | 11/2019 | Kim et al. | |
| 2020/0194753 | A1 | 6/2020 | Fujiwara et al. | |
| 2020/0321571 | A1* | 10/2020 | Ishikawa .......... | H01M 10/0468 |
| 2021/0020879 | A1 | 1/2021 | Lee | |
| 2022/0127318 | A1 | 4/2022 | Paszek et al. | |
| 2022/0209282 | A1 | 6/2022 | Chi et al. | |

FOREIGN PATENT DOCUMENTS

| | | | |
|---|---|---|---|
| CN | 105845866 | A | 8/2016 |
| CN | 106329030 | A | 1/2017 |
| CN | 110168771 | A | 8/2019 |
| CN | 209344190 | U | 9/2019 |
| CN | 110710022 | A | 1/2020 |
| CN | 110915022 | A | 3/2020 |
| EP | 3 039 731 | A1 | 7/2016 |
| JP | 2004-63352 | A | 2/2004 |
| JP | 2005-116427 | A | 4/2005 |
| JP | 2005-222939 | A | 8/2005 |
| JP | 2007-294407 | A | 11/2007 |
| JP | 4070798 | B2 | 4/2008 |
| JP | 2008-124033 | A | 5/2008 |
| JP | 2016-33905 | A | 3/2016 |
| JP | 2016-39111 | A | 3/2016 |
| JP | 2016-103328 | A | 6/2016 |
| JP | 2017-69169 | A | 4/2017 |
| JP | 2018-6043 | A | 1/2018 |
| JP | 2018-129240 | A | 8/2018 |
| JP | 2019-125455 | A | 7/2019 |
| JP | 2020-507186 | A | 3/2020 |
| KR | 10-2015-0057363 | A | 5/2015 |
| KR | 10-1853526 | B1 | 4/2018 |
| KR | 10-2020-0017818 | A | 2/2020 |
| KR | 10-2020-0030966 | A | 3/2020 |
| KR | 10-2092268 | B1 | 3/2020 |
| WO | WO2012/029270 | A1 | 3/2012 |
| WO | WO 2015/068753 | A | 5/2015 |
| WO | WO2017/068705 | A1 | 4/2017 |

OTHER PUBLICATIONS

Machine Translation of KR10-2586066, obtained Aug. 2025 (Year: 2020).*

Extended European Search Report for European Application No. 21872729.5, dated May 21, 2024.

International Search Report for PCT/KR2021/011182 (PCT/ISA/210) mailed on Nov. 30, 2021.

Supplementary Partial European Search Report for European Application No. 21872729.5, dated Feb. 29, 2024.

* cited by examiner

【FIG. 1】
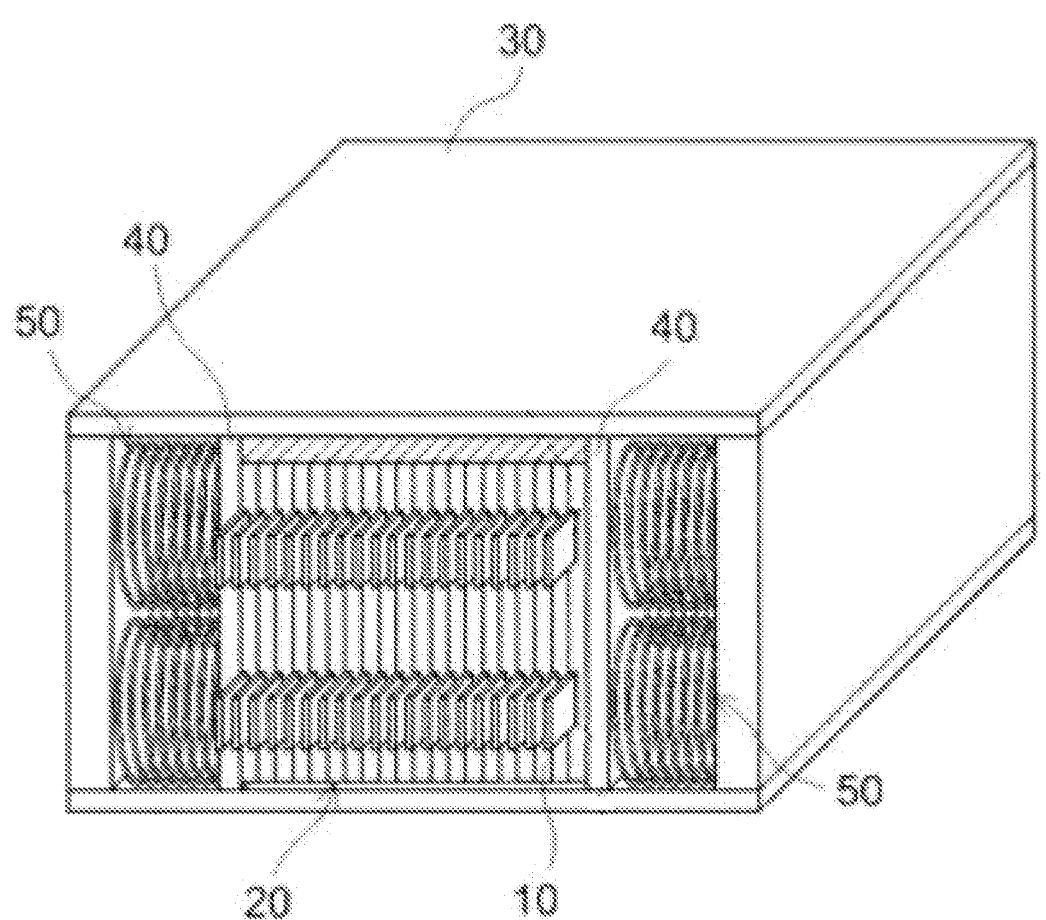

【FIG. 2】
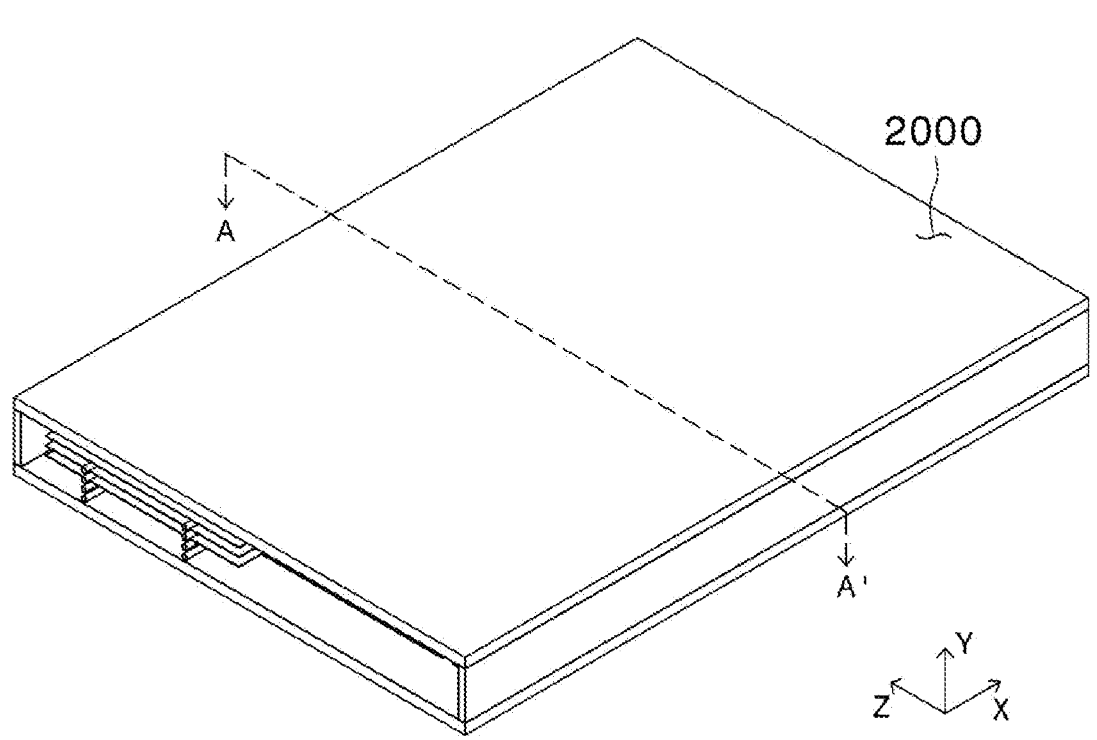

【FIG. 3】
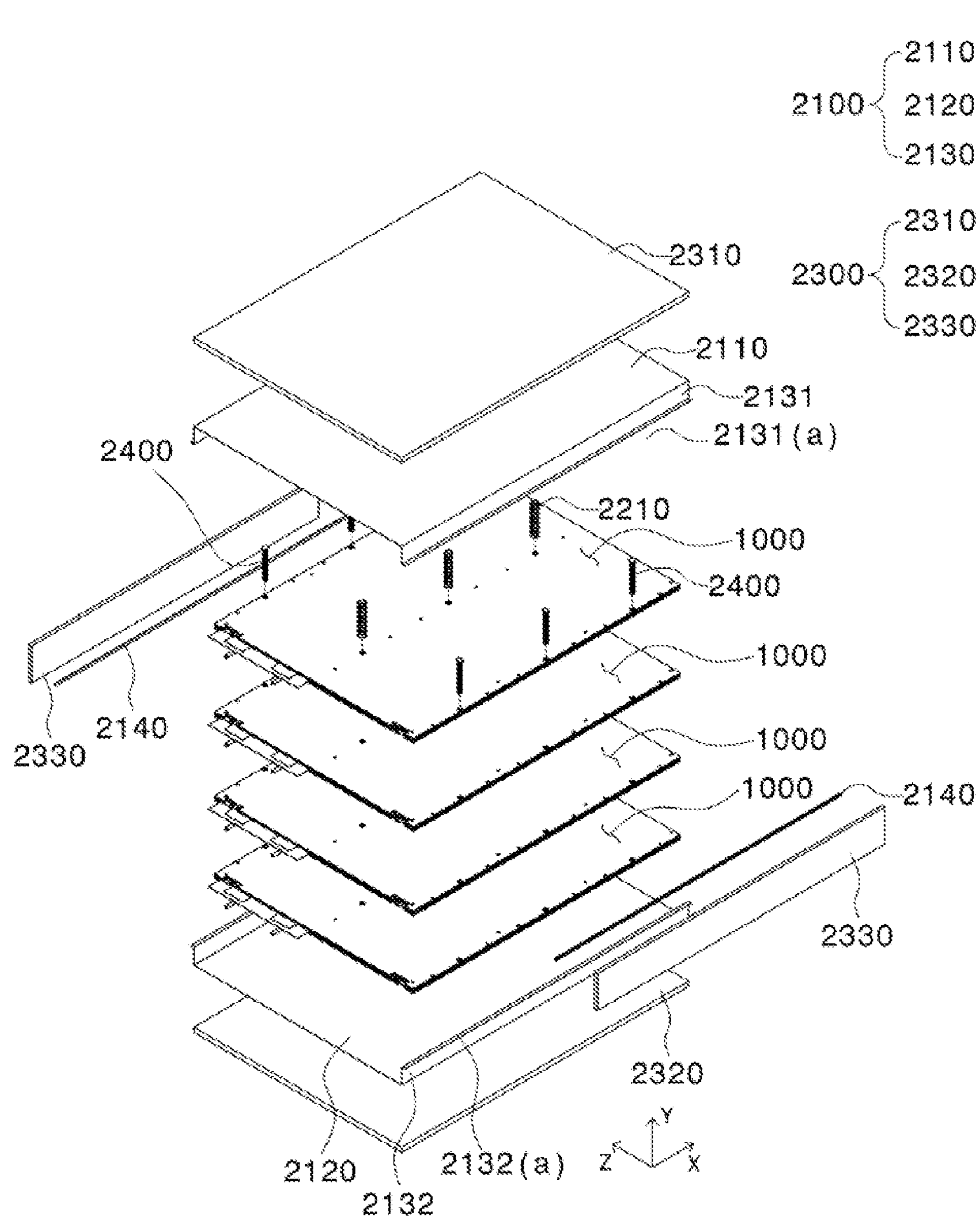

【FIG. 4】
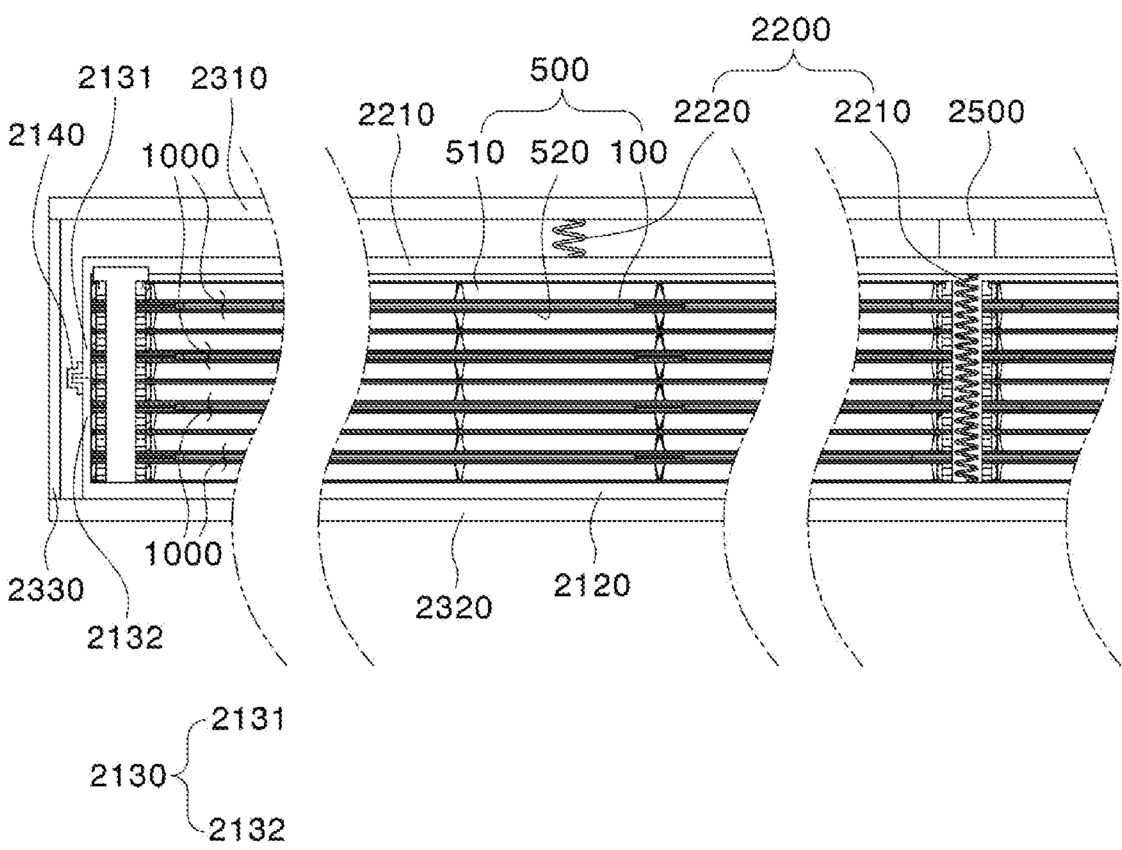

【FIG. 5】
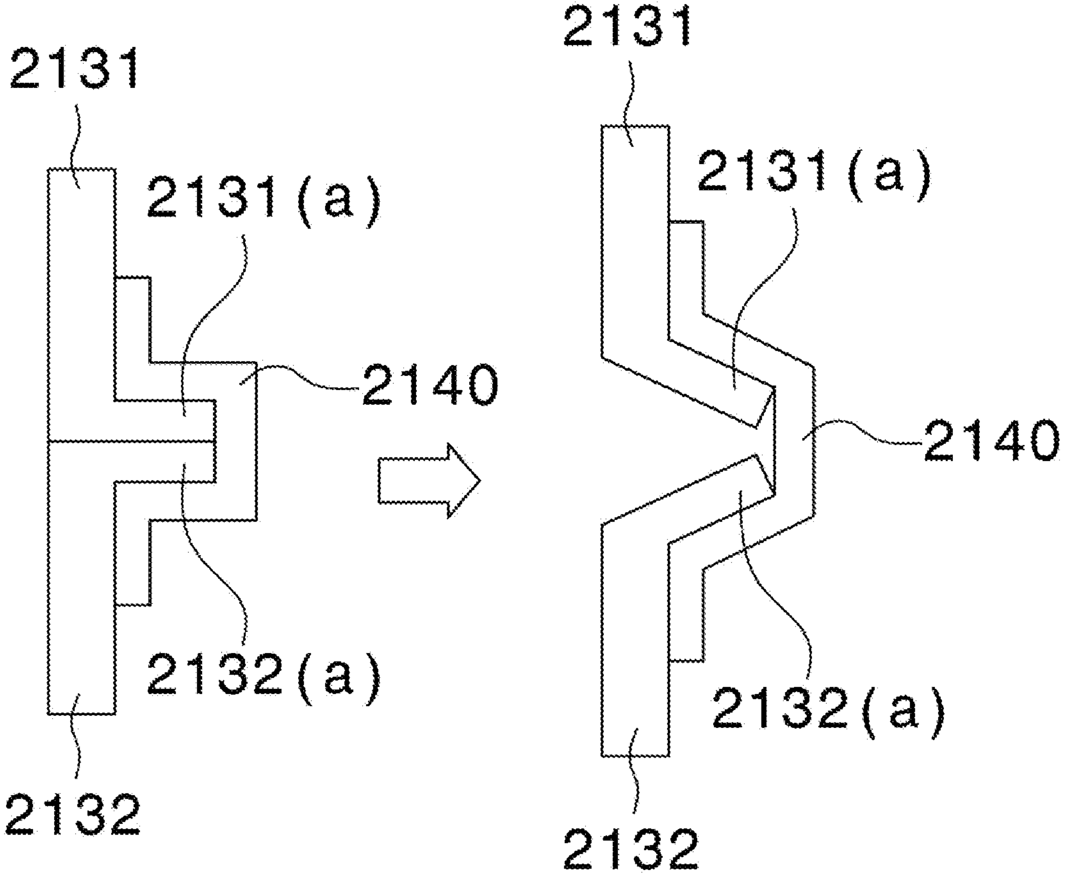

【FIG. 6】
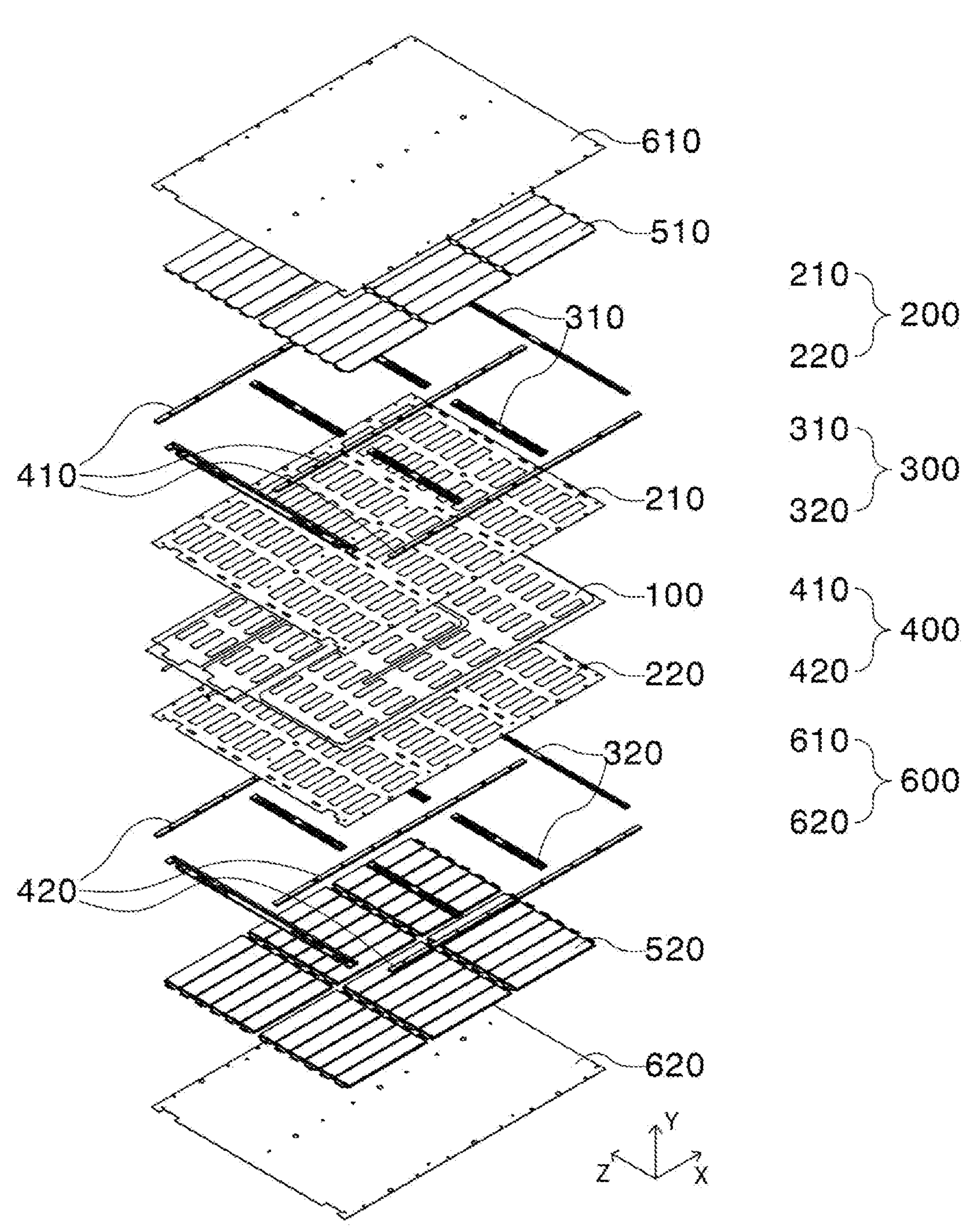

【FIG. 7】
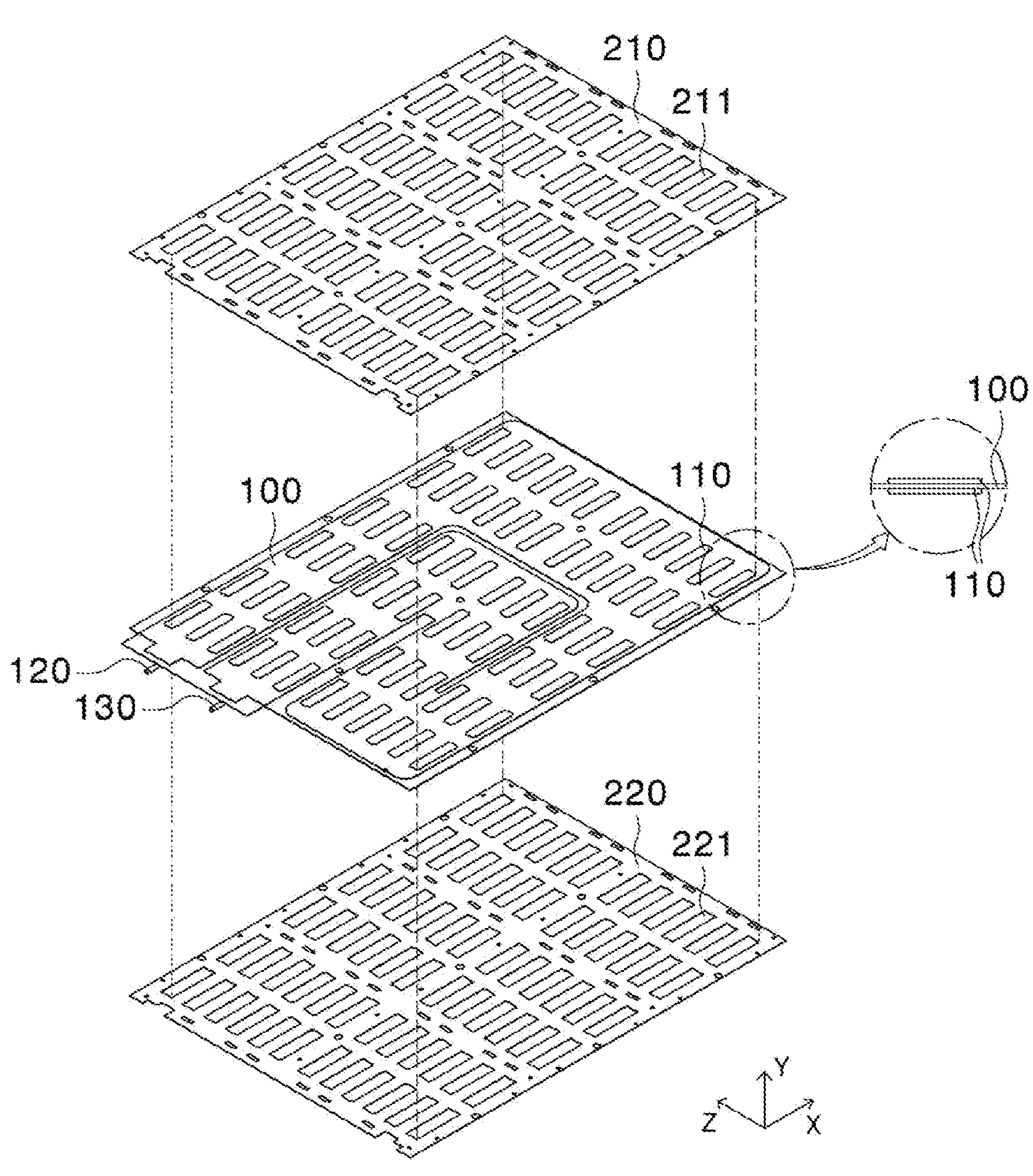

【FIG. 8】
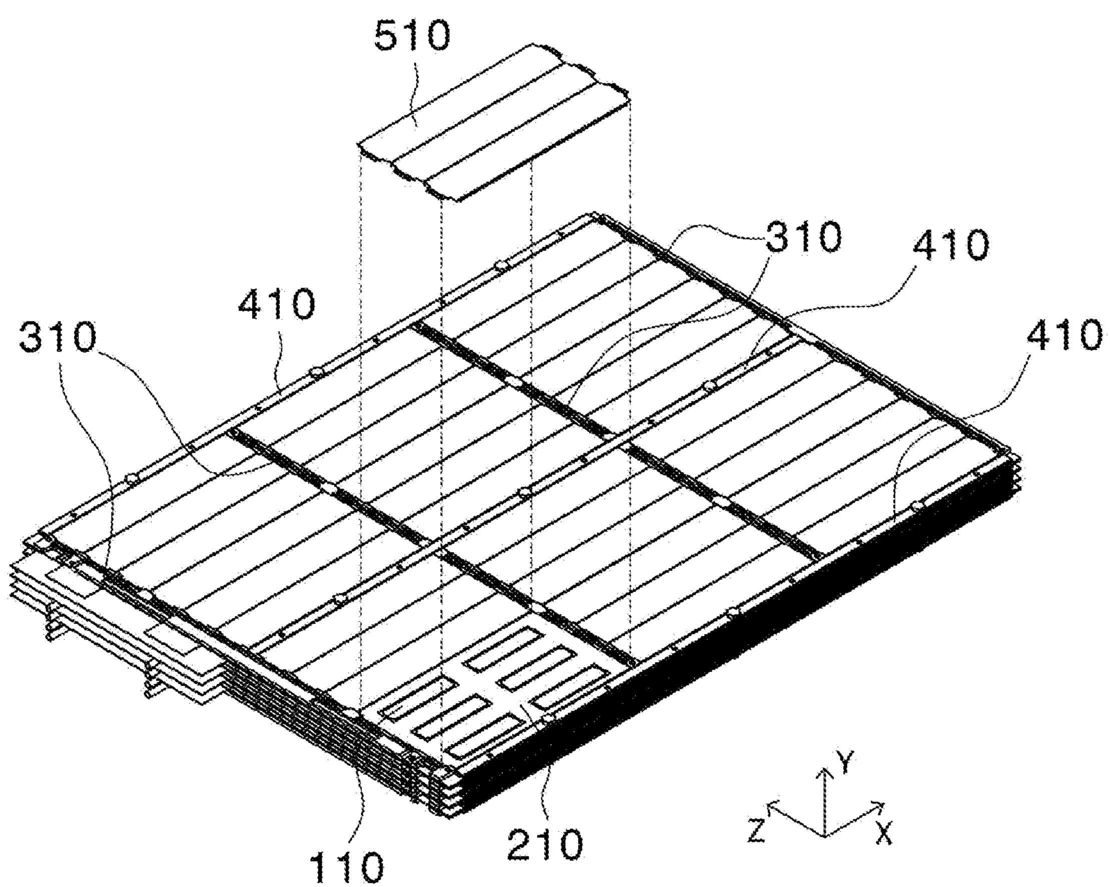

【FIG. 9】
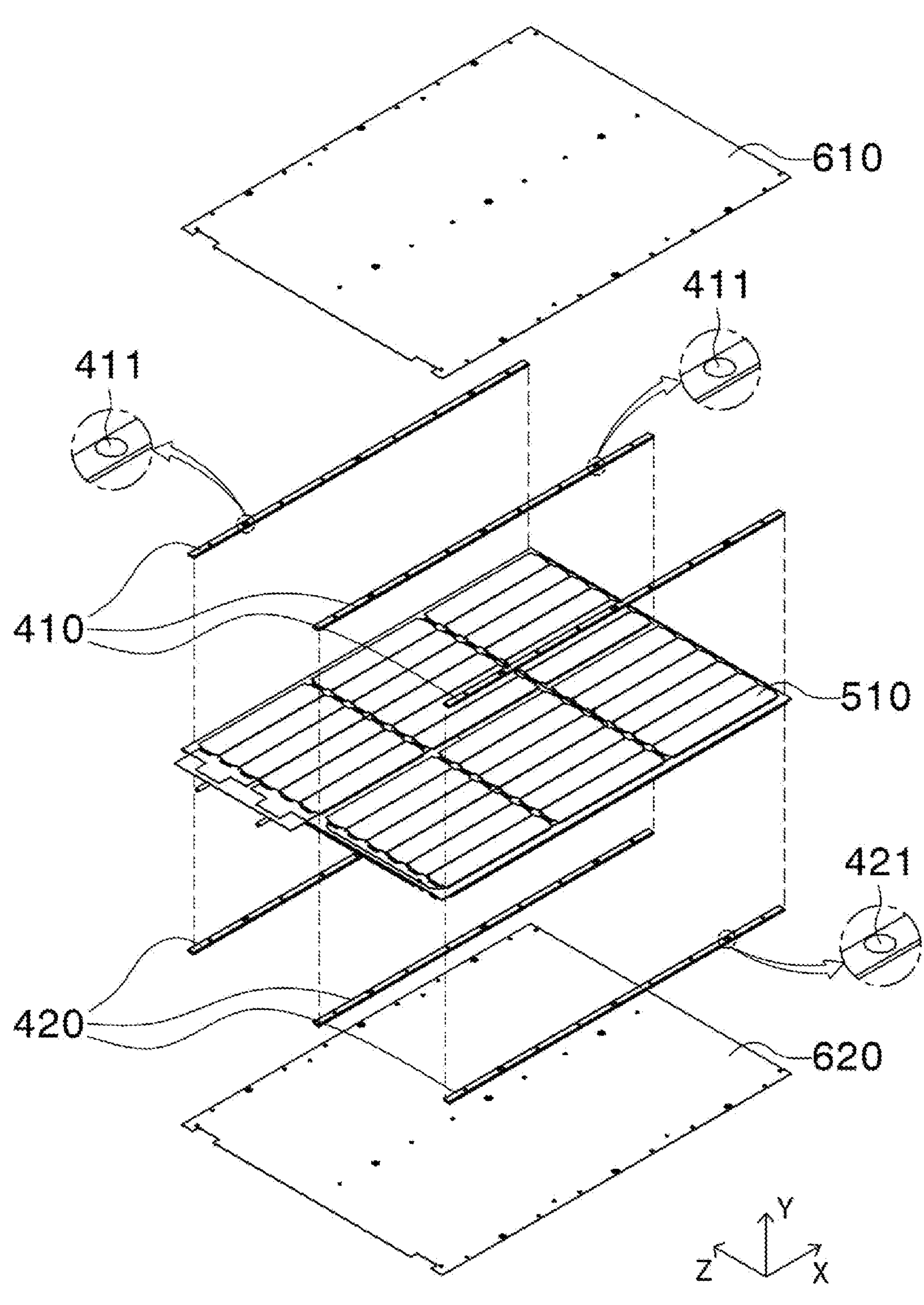

【FIG. 10】
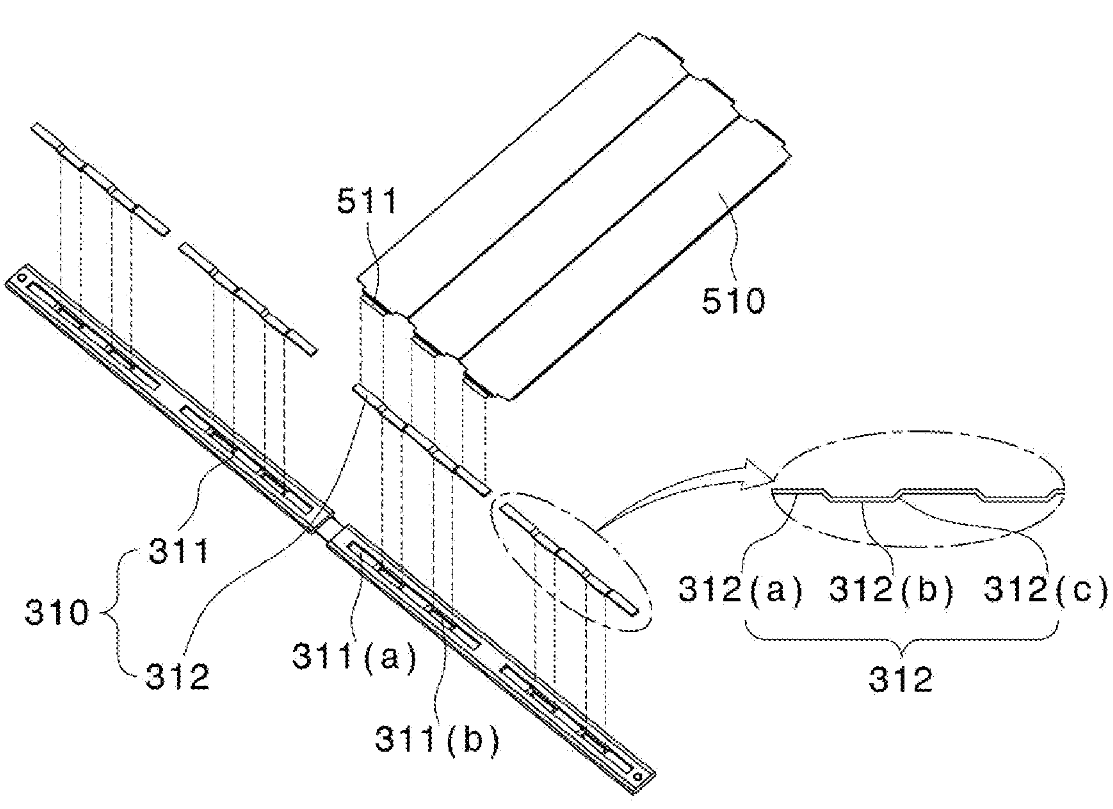

BATTERY PACK WITH INCREASED LIFESPAN OF BATTERY CELL AND DEVICE INCLUDING THE SAME

TECHNICAL FIELD

This application claims the benefit of priority to Korean Patent Application No. 2020-0121933 filed on Sep. 22, 2020, the disclosure of which is incorporated herein by reference in its entirety.

The present invention relates to a battery pack and a device including the same, and more particularly to a battery pack with increased lifespan of a battery cell configured to have a structure in which pressure applied to the battery cell is maintained at an appropriate level, whereby lifespan of the battery cell is extended, and the battery cell is in surface contact with a heat sink, whereby rapid heat dissipation is achieved, and a device including the same.

BACKGROUND ART

With recent development of alternative energies due to air pollution and energy depletion caused as the result of use of fossil fuels, demand for secondary batteries capable of storing electrical energy that is produced has increased. The secondary batteries, which are being capable of being charged and discharged, are intimately used in daily life. For example, the secondary batteries are used in mobile devices, electric vehicles, and hybrid electric vehicles.

Required capacities of secondary batteries used as energy sources of various kinds of electronic devices inevitably used in modern society have been increased due to an increase in usage of mobile devices, increasing complexity of the mobile devices, and development of electric vehicles. In order to satisfy demand of users, a plurality of battery cells is disposed in a small-sized device, whereas a battery module including a plurality of battery cells electrically connected to each other or a battery pack including a plurality of battery modules is used in a vehicle.

Meanwhile, a battery cell swells during repeated charging and discharging thereof, whereby the overall volume of the battery cell is increased. In order to increase lifespan of the battery cell, however, electrical contact between an electrode and an active material must be improved. To this end, it is necessary to constantly apply a predetermined level of pressing force to the battery cell.

FIG. 1 is a perspective view showing the structure of a conventional battery module. As shown in FIG. 1, the conventional battery module includes a plurality of single cells 10 disposed perpendicular to a heat sink 20, a case 30 configured to wrap the plurality of single cells 10 in order to protect the plurality of single cells, pressing plates 40 located at opposite sides of the plurality of single cells 10 vertically disposed, and pressure adjustment members 50 located between the pressing plates 40 and the case 30.

The conventional battery module is configured to have a structure in which the pressure adjustment members 50, which are elastic members, are located between the case 30 and the pressing plates 40 in order to press the opposite sides of the single cells 10, whereby an increase in volume of the single cells at the time of swelling is inhibited.

In the conventional battery module, however, only pressing is performed and no pressure adjustment function is provided. As a result, it is not possible to increase lifespan of the battery cells.

PRIOR ART DOCUMENT (Patent Document 1) Japanese Patent Application Publication No. 2019-125455

DISCLOSURE

Technical Problem

The present invention has been made in view of the above problems, and it is an object of the present invention to provide a battery pack having a structure capable of constantly pressing a battery cell within a predetermined range irrespective of swelling of the battery cell and a device including the same.

It is another object of the present invention to provide a battery pack capable of inhibiting occurrence of a secondary problem due to heat generation by efficiently removing heat generated from a battery cell and a device including the same.

It is a further object of the present invention to provide a battery pack capable of reducing battery cell cooling deviation by increasing adhesion force and a device including the same.

Technical Solution

In order to accomplish the above objects, a battery pack according to the present invention includes a plurality of battery modules stacked in a vertical direction; a pressing member including an upper pressing plate located outside the plurality of battery modules, a lower pressing plate located under the plurality of battery modules, a plurality of side plates configured to connect the upper pressing plate and the lower pressing plate to each other, and a reinforcement portion; and a pack case configured to wrap the pressing member, wherein each of the side plates includes an upper side plate and a lower side plate disposed in tight-contact with each other or fixed to each other via an adhesive, and the reinforcement portion is located where each upper side plate and the each lower side plate are disposed in tight contact with each other or fixed to each other.

Also, in the battery pack according to the present invention, the upper side plate may be provided at a lower edge thereof with a first extension portion protruding outwards by a predetermined length, the lower side plate may be provided at an upper edge thereof with a second extension portion protruding outwards by a predetermined length, and the first extension portion and the second extension portion may be disposed in tight-contact with each other or fixed to each other.

Also, in the battery pack according to the present invention, the reinforcement portion may be configured to wrap the first extension portion and the second extension portion.

Also, in the battery pack according to the present invention, the reinforcement portion may be made of a metal material deformable by external force.

Also, in the battery pack according to the present invention, the pack case may include an upper pack cover and a lower pack cover, and a second elastic member may be provided between the upper pack cover and the upper pressing plate.

Also, in the battery pack according to the present invention, a distance retention portion may be located between the upper pack cover and the upper pressing plate, the distance retention portion being a quadrangular pillar made of a metal material.

Also, in the battery pack according to the present invention, each of the plurality of battery modules may include a heat sink having a predetermined area, the heat sink being horizontally located; a support plate including an upper support plate and a lower support plate located respectively at the upper surface and the lower surface of the heat sink; a battery cell including a first battery cell disposed in contact with the upper support plate and a second battery cell disposed in contact with the lower support plate; and a cover plate including an upper cover plate located above the first battery cell and a lower cover plate located under the second battery cell.

Also, in the battery pack according to the present invention, the heat sink may be provided on the upper surface thereof with a first protuberance protruding by a predetermined height, the upper support plate may be provided with a first opening configured to receive the first protuberance, and the first battery cell may be located at the upper surface of the first protuberance.

Also, in the battery pack according to the present invention, the heat sink may be provided on the lower surface thereof with a second protuberance protruding by a predetermined height, the lower support plate may be provided with a second opening configured to receive the second protuberance, and the second battery cell may be located at the lower surface of the second protuberance.

Also, in the battery pack according to the present invention, upper support frames may be located between the upper support plate and the upper cover plate, the upper support frames including first upper support frames extending along opposite edges of the upper cover plate and a second upper support frame extending along the middle of the upper cover plate while having a predetermined height and width.

Also, in the battery pack according to the present invention, second lower support frames may be located between the lower support plate and the lower cover plate, the lower support frames including first lower support frames extending along opposite edges of the lower cover plate and a second lower support frame extending along the middle of the lower cover plate while having a predetermined height and width.

Also, in the battery pack according to the present invention, the second upper support frame has a first through-hole and the second lower support frame has a second through-hole configured to allow a first elastic member to be inserted therethrough.

Also, in the battery pack according to the present invention, a first busbar assembly may be located between the upper support plate and the upper cover plate, and the first busbar assembly may include a first busbar frame having a first receiving recess formed therein and a busbar seated in the first receiving recess, the busbar being configured to have a concave-convex structure that is bent at a predetermined angle a plurality of times.

Also, in the battery pack according to the present invention, a second busbar assembly may be located between the lower support plate and the lower cover plate.

In addition, the present invention provides a device including the battery pack.

Advantageous Effects

As is apparent from the above description, a battery pack with increased lifespan of a battery cell according to the present invention and a device including the same have an advantage in that an elastic member is provided between an upper pressing plate and a lower pressing plate, and a reinforcement portion is located at the portion at which an upper side plate and a lower side plate are connected to each other, whereby it is possible to constantly press battery cells disposed inside a pressing member within a predetermined range, and therefore it is possible to increase lifespan of the battery cells.

In addition, the battery pack with increased lifespan of the battery cell according to the present invention and the device including the same have a merit in that relatively wide side surfaces of the battery cells and a heat sink are in tight contact with each other in a state of being located in a horizontal direction, whereby cooling performance of the battery cells is improved due to an increase in heat transfer area.

Furthermore, the battery pack with increased lifespan of the battery cell according to the present invention and the device including the same have an advantage in that the battery cells, the heat sink, a support plate, etc. are fastened to each other via a plurality of support frames and fastening members, whereby it is possible to maintain uniform adhesion force between the battery cells and the heat sink while maximizing space utilization.

DESCRIPTION OF DRAWINGS

FIG. 1 is a perspective view of a conventional battery module.

FIG. 2 is a perspective view of a battery pack according to a preferred embodiment of the present invention.

FIG. 3 is an exploded perspective view of the battery pack shown in FIG. 2.

FIG. 4 is a sectional view taken along line A-A' of FIG. 2.

FIG. 5 is a schematic view illustrating deformation of a side plate and a reinforcement portion at the time of swelling.

FIG. 6 is an exploded perspective view of a battery module according to a preferred embodiment of the present invention.

FIG. 7 is a perspective view illustrating a coupling structure between a heat sink and a support plate in the battery module according to the preferred embodiment of the present invention.

FIG. 8 is a perspective view illustrating a battery cell mounting structure in the battery module according to the preferred embodiment of the present invention.

FIG. 9 is a perspective view illustrating a support frame disposition structure in the battery module according to the preferred embodiment of the present invention.

FIG. 10 is a perspective view illustrating a coupling structure between battery cells and busbars in the battery module according to the preferred embodiment of the present invention.

BEST MODE

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

In addition, the same reference numbers will be used throughout the drawings to refer to parts that perform similar functions or operations. In the case in which one part is said to be connected to another part in the entire specification, not only may the one part be directly connected to the other part, but also, the one part may be indirectly connected to the other part via a further part. In addition, that a certain element is included does not mean that other elements are excluded, but means that such elements may be further included unless mentioned otherwise.

Hereinafter, a battery pack with increased lifespan of a battery cell according to the present invention will be described with reference to the accompanying drawings.

FIG. 2 is a perspective view of a battery pack according to a preferred embodiment of the present invention, FIG. 3 is an exploded perspective view of the battery pack shown in FIG. 2, FIG. 4 is a sectional view taken along line A-A' of FIG. 2, and FIG. 5 is a schematic view illustrating deformation of a side plate and a reinforcement portion upon swelling.

As shown in FIGS. 2 to 4, the battery pack 2000 according to the present invention includes a plurality of vertically stacked battery modules 1000, a pressing member 2100 located at the upper surface and the lower surface of the plurality of stacked battery modules 1000, an elastic member 2200, a pack case 2300, a plurality of fastening members 2400 configured to fix the battery modules 1000, and a distance retention portion 2500.

First, the pressing member 2100 includes an upper pressing plate 2110 located on the upper surface of the stacked battery modules 1000 in tight contact therewith, a lower pressing plate 2120 located on the lower surface of the stacked battery modules 1000 in tight contact therewith, a plurality of side plates 2130 located at opposite side surfaces of the battery modules 1000 in a state of being spaced apart therefrom by a predetermined distance, and a reinforcement portion 2140.

Here, each of the side plates 2130 includes an upper side plate 2131 having a first extension portion 2131(*a*) formed as the result of the vicinity of a lower edge of the upper side plate protruding outwards by a predetermined length and a lower side plate 2132 having a second extension portion 2132(*a*) formed as the result of the vicinity of an upper edge of the lower side plate protruding outwards by a predetermined length. The first extension portion 2131(*a*) and the second extension portion 2132(*a*) are disposed in tight contact with each other, or are fixed to each other using an adhesive.

The reinforcement portion 2140 wraps the first extension portion 2131(*a*) and the second extension portion 2132(*a*) outside the first extension portion and the second extension portion. To this end, the reinforcement portion is bent a plurality of times so as to provide a pocket configured to receive the first extension portion 2131(*a*) and the second extension portion 2132(*a*). Of course, it is obvious that the shape of the reinforcement portion may be changed without limit as long as the above function can be performed.

As shown in FIG. 5, therefore, the first extension portion 2131(*a*) and the second extension portion 2132(*a*) remain in tight contact with each other in the state in which the battery cells are normal. When the volume of the battery cells is increased due to swelling, however, the reinforcement portion 2140 or the adhesive somewhat inhibits separation between the upper side plate 2131 and the lower side plate 2132, whereby predetermined pressure is applied to the battery cells. Particularly, in the case in which the reinforcement portion 2140 is made of a metal material that is deformable by external force, it is possible to prevent abrupt displacement of the battery cells even though the battery cells abruptly expand due to severe swelling thereof to the extent to which the pressure applied to the battery cells exceeds a specific level.

The elastic member 2200 includes a first elastic member 2210 and a second elastic member 2220. One side of each of a plurality of first elastic members 2210, which are inserted perpendicularly through middle parts of the battery modules 1000, is connected to the upper pressing plate 2110, and the other side of each of the first elastic members is connected to the lower pressing plate 2120. Since middle parts of the upper pressing plate 2110 and the lower pressing plate 2120 are pulled, therefore, it is possible to constantly press battery cells 500 located at the middle parts of the battery modules 1000 within a predetermined range irrespective of swelling.

The first elastic member 2210 provides tensile force between the upper pressing plate 2110 and the lower pressing plate 2120, whereas the second elastic member 2220 is located between the upper pressing plate 2110 and an upper pack cover 2310 to provide pressing force. In particular, it is preferable for the second elastic member 2220 to be provided in plural in a state of being spaced apart from each other by a predetermined distance. The second elastic member inhibits bending of the pressing member that may be caused by swelling deviation between the battery cells, whereby it is possible to minimize deviation in pressing force.

Here, each of the first elastic member 2210 and the second elastic member 2220 may be a coil. However, the present invention is not limited thereto.

The pack case 2300 includes an upper pack cover 2310 located at the upper surface of the upper pressing plate 2110, a lower pack cover 2320 located at the lower surface of the lower pressing plate 2120, and side pack covers 2330 located parallel to the side plates 2130.

The fastening members 2400 are configured to fix the plurality of battery modules 1000, which are stacked in a vertical direction, using predetermined force. As an example, each of the fastening members may be a bolt having a screw thread formed at one end thereof, and a nut may be fastened to the other side of the fastening member in order to fix the battery modules 1000.

Of course, it is preferable for the nuts to be somewhat loosely fastened to the fastening members in consideration of expansion of the battery modules upon swelling.

Meanwhile, the distance retention portion 2500 may be further provided between the upper pressing plate 2110 and the upper pack cover 2310 at the middle thereof in order to supplement tensile force by the first elastic member 2210 and pressing force by the second elastic member 2220. The distance retention portion may be a quadrangular pillar made of metal.

FIG. 6 is an exploded perspective view of a battery module according to a preferred embodiment of the present invention. As shown in FIG. 6, the battery module 1000 includes a heat sink 100, a support plate 200, a busbar assembly 300, a support frame 400, battery cells 500, and a cover plate 600.

First, the heat sink 100 is a flat plate that is provided with a flow channel defined therein and has a predetermined area. A plurality of protuberances 110 is formed on the upper surface and the lower surface of the heat sink 100 so as to protrude therefrom in a state of being spaced apart from each other by a predetermined distance. The protuberances 110 will be described below in detail.

The support plate 200 includes an upper support plate 210 and a lower support plate 220 located at opposite surfaces of the heat sink 100, more specifically the upper surface of the heat sink 100 and the lower surface of the heat sink 100, respectively.

The busbar assembly 300 configured to electrically connect the battery cells 500 to each other includes a first busbar assembly 310 and a second busbar assembly 320. The first busbar assembly 310 is located at the upper surface of the upper support plate 210, and the second busbar assembly 320 is disposed at the lower surface of the lower support plate 220.

A total of six first busbar assemblies 310, one of which is located in the vicinity of each of opposite edges of the upper support plate 210 and four of which are located between the two first busbar assemblies located in the vicinity of the opposite edges of the upper support plate in a state of being spaced apart from each other by a predetermined distance in a longitudinal direction (an X-axis direction), are shown in the figure, which, however, is merely an example. The number or position of first busbar assemblies may be changed as long as the first busbar assemblies can be brought into tight contact with the upper support plate 210.

The second busbar assemblies 320 are symmetrical with the first busbar assemblies 310, and therefore an additional description thereof will be omitted.

Next, the support frame 400 includes first support frames 410 and second support frames 420. The first support frames 410 are located between the upper support plate 210 and an upper cover plate 610, and the second support frames 420 are located between the lower support plate 220 and the lower cover plate 620. The first support frames and the second support frames will be described below in more detail.

The battery cells 500 include a plurality of first battery cells 510 and a plurality of second battery cells 520 located parallel to the heat sink 100. Specifically, the first battery cells 510 are located between the upper support plate 210 and the upper cover plate 610, and the second battery cells 520 are located between the lower support plate 220 and the lower cover plate 620.

The first battery cells 510 and the second battery cells 520 may be battery cells having the same construction. For example, each battery cell may include a cell case, in which an electrode assembly (not shown) is received, and a pair of electrode leads.

Here, the electrode assembly may be a jelly-roll type assembly, which is configured to have a structure in which a long sheet type positive electrode and a long sheet type negative electrode are wound in the state in which a separator is interposed therebetween, a stacked type assembly which is configured to have a structure in which a rectangular positive electrode and a rectangular negative electrode are stacked in the state in which a separator is interposed therebetween, a stacked and folded type assembly, which is configured to have a structure in which unit cells are wound using a long separation film, or a laminated and stacked type assembly, which is configured to have a structure in which battery cells are stacked in the state in which a separator is interposed therebetween and are then attached to each other. However, the present invention is not limited thereto. It is preferable for the electrode assembly according to the present invention to be a stacked and folded type assembly or a laminated and stacked type assembly, which has lowest physical stress when a curved module is formed.

The electrode assembly is received in the cell case. The cell case is generally configured to have a laminate sheet structure including an inner layer, a metal layer, and an outer layer. The inner layer is disposed in direct contact with the electrode assembly, and therefore the inner layer must exhibit high insulation properties and high resistance to an electrolytic solution. In addition, the inner layer must exhibit high sealability in order to hermetically seal the cell case from the outside, i.e. a thermally-bonded sealed portion between inner layers must exhibit excellent thermal bonding strength. The inner layer may be made of a material selected from among a polyolefin-based resin, such as polypropylene, polyethylene, polyethylene acrylate, or polybutylene, a polyurethane resin, and a polyimide resin, which exhibit excellent chemical resistance and high sealability. However, the present invention is not limited thereto, and polypropylene, which exhibits excellent mechanical-physical properties, such as tensile strength, rigidity, surface hardness, and impact strength resistance, and excellent chemical resistance, is the most preferably used.

The metal layer, which is disposed so as to abut the inner layer, corresponds to a barrier layer configured to prevent moisture or various kinds of gas from permeating into the battery from the outside. An aluminum thin film, which is light and easily shapeable, may be used as a preferred material for the metal layer.

The outer layer is provided on the other surface of the metal layer. The outer layer may be made of a heat-resistant polymer that exhibits excellent tensile strength, resistance to moisture permeation, and resistance to air transmission such that the outer layer exhibits high heat resistance and chemical resistance while protecting the electrode assembly. As an example, the outer layer may be made of nylon or polyethylene terephthalate. However, the present invention is not limited thereto.

Meanwhile, the pair of electrode leads is constituted by a positive electrode lead and a negative electrode lead, which may be exposed from the cell case in a state of being electrically connected respectively to positive electrode tabs and negative electrode tabs of the electrode assembly or may be directly connected to the electrode assembly in the state in which tabs are omitted.

Next, the cover plate 600 serves to protect the battery cells 500 from the outside, and includes an upper cover plate 610 and a lower cover plate 620.

Specifically, the upper cover plate 610 is located above the first battery cells 510 to protect the upper surfaces of the first battery cells 510, and the lower cover plate 620 is located above the second battery cells 520 to protect the lower surfaces of the second battery cells 520.

Each of the upper cover plate 610 and the lower cover plate 620 is provided with a plurality of through-holes formed so as to be spaced apart from each other by a predetermined distance such that the fastening members 2400 are inserted therethrough.

FIG. 7 is a perspective view illustrating a coupling structure between the heat sink and the support plate in the battery module according to the preferred embodiment of the present invention.

Referring to FIG. 7, the upper support plate 210 is located at the upper surface of the heat sink 100 according to the present invention, and the lower support plate 220 is located at the lower surface of the heat sink 100 according to the present invention.

Meanwhile, it is preferable for the protuberances 110 to be formed on the opposite surfaces of the heat sink 100, i.e. the upper surface and the lower surface of the heat sink, so as to protrude therefrom by a predetermined height while having a predetermined shape. It is more preferable for the upper support plate 210 to have first openings 211 configured to receive the protuberances 110 formed on the upper surface of the heat sink 100 and for the lower support plate 220 to have second openings 221 configured to receive the protuberances 110 formed on the lower surface of the heat sink 100.

When the upper support plate 210 and the lower support plate 220 are brought respectively into tight contact with the upper surface and the lower surface of the heat sink 100 having the protuberances 110 formed on the opposite surfaces thereof, the protuberances 110 formed on the upper surface of the heat sink 100 are inserted into the first openings 211, and the protuberances 110 formed on the lower surface of the heat sink 100 are inserted into the second openings 221, whereby rolling of the heat sink from side to side may be prevented.

Here, each of the upper support plate 210 and the lower support plate 220 may be made of a thermally conductive resin.

Meanwhile, a coolant inlet port 120 configured to supply a coolant is provided at one side of the heat sink 100, and a coolant outlet port 130 configured to discharge the coolant that has performed heat exchange is provided in the vicinity of the coolant inlet port. It is obvious that the coolant inlet port 120 and the coolant outlet port 130 are not necessarily located so as to be adjacent to each other as long as it is possible to supply and discharge the coolant.

FIG. 8 is a perspective view illustrating a battery cell mounting structure in the battery module according to the preferred embodiment of the present invention, and FIG. 9 is a perspective view illustrating a support frame disposition structure in the battery module according to the preferred embodiment of the present invention.

The plurality of first battery cells 510 according to the present invention is horizontally seated on the protuberances 110 of the heat sink 100, exposed to the outside in a state of being inserted through the first openings 211 of the upper support plate 210, and the upper support plate 210.

A conventional battery module is configured to have a structure in which battery cells are located perpendicular to a heat sink, whereby contact area between the battery cells and the heat sink is small, and therefore cooling performance of the battery module is limited.

In contrast, the battery module 1000 according to the present invention is configured to have a structure in which the first battery cells 510 are located parallel to the heat sink 100 and in which the horizontal side surfaces of the first battery cells 510 contact the protuberances 110 of the heat sink 100, whereby rapid heat transfer is achieved, and therefore heat transfer efficiency is improved.

Of course, it is obvious that the remaining portions of the first battery cells 510, which are not in tight contact with the protuberances 110 of the heat sink 100, are in tight contact with the upper support plate 210.

Meanwhile, a known thermally conductive resin layer may be interposed between each of the protuberances 110 and a corresponding one of the first battery cells 510 in order to fix the protuberance and the first battery cell to each other.

The structure in which the second battery cells 520 and the lower support plate 220 are mounted is identical to the structure in which the first battery cells 510 and the upper support plate 210 are coupled to each other except for only difference in direction, and therefore a detailed description thereof will be omitted.

As previously described, the support frame 400 includes the first support frames 410 and the second support frames 420.

The first support frames 410 are located between the upper support plate 210 and the upper cover plate 610, more specifically at opposite edges and the middle of the upper support plate 210 in the longitudinal direction of the battery module (the X-axis direction). Each of the first support frames is a bar that has a predetermined width, height, and length and that has an approximately quadrangular section. Each of the first support frames 410 is provided with a plurality of first through-holes 411 formed so as to be spaced apart from each other by a predetermined distance such that the fastening members 2400 can be inserted therethrough.

The second support frames 420 are identical in construction to the first support frames 410 except that the second support frames are located between the lower support plate 220 and the lower cover plate 620. That is, each of the second support frames 420 is provided with a plurality of second through-holes 421 formed so as to be spaced apart from each other by a predetermined distance such that the fastening members 2400 can be inserted therethrough.

Even though the plurality of battery modules 1000 is fastened to each other in a state of being stacked, the support plate 200 and the cover plate 600 may be maintained spaced apart from each other by a predetermined distance by the first support frames 410 and the second support frames 420, whereby it is possible to prevent the battery cells from being pressed more than necessary and to inhibit local expansion at the time of swelling.

FIG. 10 is a perspective view illustrating a coupling structure between the battery cells and busbars in the battery module according to the preferred embodiment of the present invention.

When describing with further reference to FIG. 8, the busbar assembly 300 includes a first busbar assembly 310 and a second busbar assembly 320, which are identical in construction to each other except for only difference in disposition. Hereinafter, therefore, a description will be given based on the first busbar assembly 310.

The first busbar assembly 310 includes a first busbar frame 311 and busbars 312. The first busbar frame 311 is configured to electrically connect adjacent ones of the busbars 312 to each other while supporting the busbars 312. The first busbar frame 311 is provided with first receiving recesses 311(*a*) configured to receive the busbars 312 in a seated state and second receiving recesses 311(*b*) depressed deeper than the first receiving recesses 311(*a*).

Each of the busbars 312, which is configured to have a concave-convex structure that is bent at a predetermined angle a plurality of times, includes a first horizontal portion 312(*a*), a second horizontal portion 312(*b*) located lower than the first horizontal portion 312(*a*), and a connection portion 312(*c*) configured to connect the first horizontal portion 312(*a*) and the second horizontal portion 312(*b*) to each other, the connection portion being bent at a predetermined angle.

When the busbar 312 having the above construction is seated in the receiving recesses of the first busbar frame 311, the first horizontal portion 312(*a*) is inserted into the first receiving recess 311(*a*), and the second horizontal portion 312(*b*) is inserted into the second receiving recess 311(*b*), whereby the busbar 312 is securely fastened to the first busbar frame 311.

Meanwhile, an electrode lead 511 of each of the first battery cells 510 is seated on the first horizontal portion 312(*a*).

The conventional battery module has no function of cooling the busbar assembly 300 or further needs to have such a cooling function. In the present invention, however, the busbar assembly 300 is located in surface contact on the upper support plate 210 and the lower support plate 220 located respectively at the upper surface and the lower surface of the heat sink 100, whereby it is possible to cool the busbar assembly 300 using only the heat sink 100, which is configured to cool the battery cells, and therefore it is possible to minimize an increase in volume of the battery module.

The present invention may provide a device including a battery pack having at least one of the above-mentioned features, and the device may be an electric vehicle, a hybrid electric vehicle, or a plug-in hybrid electric vehicle.

Those skilled in the art to which the present invention pertains will appreciate that various applications and modifications are possible within the category of the present invention based on the above description.

DESCRIPTION OF REFERENCE SYMBOLS

1000: Battery module
100: Heat sink
110: Protuberance
120: Coolant inlet port
130: Coolant outlet port
200: Support plate
210: Upper support plate
211: First opening
220: Lower support plate
221: Second opening
300: Busbar assembly
310: First busbar assembly
311: First busbar frame
311(*a*): First receiving recess 311(*b*): Second receiving recess
312: Busbar
312(*a*): First horizontal portion 312(*b*): Second horizontal portion
312(*c*): Connection portion
320: Second busbar assembly
400: Support frame
410: First support frame 411: First through-hole
420: Second support frame 421: Second through-hole
500: Battery cell
510: First battery cell
511: Electrode lead
520: Second battery cell
600: Cover plate
610: Upper cover plate
620: Lower cover plate
2000: Battery pack
2100: Pressing member
2110: Upper pressing plate
2120: Lower pressing plate
2130: Side plate
2131: Upper side plate 2131(*a*): First extension portion
2132: Lower side plate 2132(*a*): Second extension portion
2140: Reinforcement portion
2200: Elastic member
2210: First elastic member
2220: Second elastic member
2300: Pack case
2310: Upper pack cover
2320: Lower pack cover
2330: Side pack cover
2400: Fastening member
2500: Distance retention portion

The invention claimed is:

1. A battery pack comprising:
a plurality of battery modules stacked in a vertical direction;
a pressing member comprising an upper pressing plate located outside the plurality of battery modules, a lower pressing plate located under the plurality of battery modules, a plurality of side plates configured to connect the upper pressing plate and the lower pressing plate to each other, and a reinforcement portion; and
a pack case configured to wrap the pressing member,
wherein each of the side plates comprises an upper side plate and a lower side plate disposed in contact with each other,
wherein the upper side plate is provided at a lower edge thereof with a first extension portion protruding outwards by a predetermined length so that the lower edge is L-shaped,
wherein the lower side plate is provided at an upper edge thereof with a second extension portion protruding outwards by a predetermined length so that the upper edge is L-shaped,
wherein the reinforcement portion is located where each upper side plate and each lower side plate are disposed in contact with each other,
wherein the first extension portion and the second extension portion fit within the reinforcement portion, and
wherein the battery pack further comprises a first elastic member inserted perpendicularly through middle parts of the plurality of battery modules, one side of the first elastic member is connected to the upper pressing plate, and the other side of the first elastic member is connected to the lower pressing plate,
wherein the first elastic member provides tensile force between the upper pressing plate and the lower pressing plate.

2. The battery pack according to claim 1, wherein the reinforcement portion is made of a metal material deformable by external force.

3. The battery pack according to claim 2, wherein the pack case comprises an upper pack cover and a lower pack cover, and wherein a second elastic member is provided between the upper pack cover and the upper pressing plate.

4. The battery pack according to claim 3, wherein a distance retention portion is located between the upper pack cover and the upper pressing plate, the distance retention portion being a quadrangular pillar made of a metal material.

5. The battery pack according to claim 1, wherein each of the plurality of battery modules comprises:
a heat sink having a predetermined area, the heat sink being horizontally located;
a support plate comprising an upper support plate and a lower support plate located respectively at an upper surface and a lower surface of the heat sink;
a battery cell comprising a first battery cell disposed in contact with the upper support plate and a second battery cell disposed in contact with the lower support plate; and
a cover plate comprising an upper cover plate located above the first battery cell and a lower cover plate located under the second battery cell.

6. The battery pack according to claim 5, wherein the heat sink is provided on the upper surface thereof with a protuberance protruding by a predetermined height, wherein the upper support plate is provided with a first opening configured to receive the protuberance, and wherein the first battery cell is located at an upper surface of the first protuberance.

7. The battery pack according to claim 5, wherein the heat sink is provided on the lower surface thereof with a protuberance protruding by a predetermined height, wherein the lower support plate is provided with a second opening configured to receive the protuberance, and wherein the second battery cell is located at a lower surface of the protuberance.

8. The battery pack according to claim 5, further comprising upper support frames located between the upper support plate and the upper cover plate, the upper support frames including first upper support frames extending along opposite edges of the upper cover plate and a second upper support frame extending along a middle of the upper cover plate while having a predetermined height and width.

9. The battery pack according to claim 8, further comprising lower support frames located between the lower support plate and the lower cover plate, the lower support frames including first lower support frames extending along opposite edges of the lower cover plate and a second lower support frame extending along a middle of the lower cover plate while having a predetermined height and width.

10. The battery pack according to claim 9, wherein the second upper support frame has a first through-hole and the second lower support frame has a second through-hole configured to allow the first elastic member to be inserted therethrough.

11. The battery pack according to claim 5, wherein a first busbar assembly is located between the upper support plate and the upper cover plate, and wherein the first busbar assembly comprises:

a first busbar frame having a first receiving recess formed therein; and a busbar seated in the first receiving recess, the busbar being configured to have a concave-convex structure that is bent at a predetermined angle a plurality of times.

12. The battery pack according to claim 11, wherein a second busbar assembly is located between the lower support plate and the lower cover plate.

13. A device comprising the battery pack according to claim 1.

* * * * *